United States Patent [19]

Page et al.

[11] 3,945,685

[45] Mar. 23, 1976

[54] FULL-POWER HYDRAULIC BRAKING SYSTEMS

[75] Inventors: Wilbur Mills Page; Phillip Applewhite, both of Lincoln, England

[73] Assignee: Clayton Dewandre Company Limited, Lincoln, England

[22] Filed: Dec. 5, 1974

[21] Appl. No.: 529,957

[52] U.S. Cl. ............................ 303/2; 188/170
[51] Int. Cl.² ............................ B60T 13/58
[58] Field of Search ............ 188/170; 303/2, 40, 13, 303/14, 9, 21

[56] References Cited
UNITED STATES PATENTS

| | | | |
|---|---|---|---|
| 3,020,094 | 2/1962 | Murty et al. | 303/9 |
| 3,599,761 | 8/1971 | Schultz et al. | 188/170 |
| 3,777,857 | 12/1973 | Hughes | 188/170 |

*Primary Examiner*—Duane A. Reger
*Attorney, Agent, or Firm*—Norris & Bateman

[57] ABSTRACT

A full-power hydraulic braking system comprises two independently powered service circuits serving separate sets of brakes, a common pedal-actuated dual brake valve controlling operation of said circuits, a spring brake actuator incorporating two hold-off pistons and having a common output to the brakes or brake linkage, and a dual hand control valve for effecting controlled operation of the two sections of the actuator respectively from the two service circuits.

4 Claims, 1 Drawing Figure

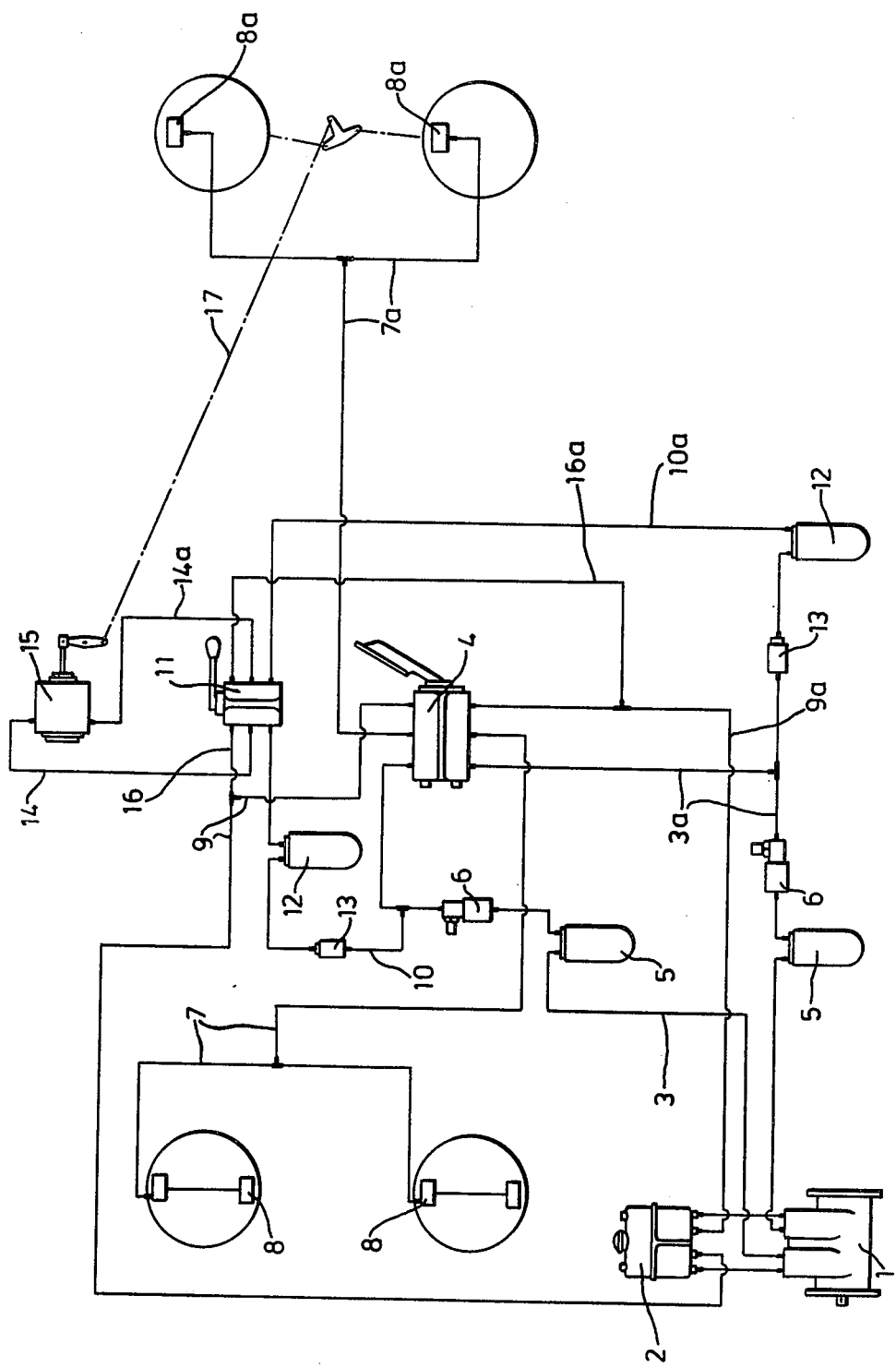

FULL-POWER HYDRAULIC BRAKING SYSTEMS

This invention relates to full-power hydraulic braking systems of the kind comprising two independtly powered service circuits serving separate sets of brakes under the control of a common pedal-actuated dual brake valve.

To systems of this kind it has been proposed to add a spring brake actuator for parking and as a supplementary braking system, such actuator being usually pressurised from the accumulator of one of the powered hydraulic service circuits and being under the control of a hand control valve. Such systems however, suffer from the defect that a failure in the spring brake actuator circuit, or in the service circuit to which it is connected, can put both said circuits out of action leaving only one service braking system available.

The object of the present invention is to provide a combined system which overcomes this defect and ensures that a failure in either service circuit does not prevent the spring brake being used normally.

According to the invention in a dual circuit hydraulic braking system of the kind mentioned a spring brake actuator is provided incorporating two hold-off pistons having a common output to the brakes or brake linkage, the two sections of the actuator being fed respectively from the two service circuits through a dual hand control valve. Thus a failure in either service circuit will still leave the other service circuit operative and will still result in control of the spring brake actuator being maintained.

As shown, the basic circuit comprises a dual pump 1, the sections of which are fed from a divided reservoir 2 and deliver pressure fluid separately and via supply lines 3, 3a to the two inlet ports of a pedal-actuated dual brake valve 4, the two supply lines 3, 3a each incorporating an accumulator 5 and a combined filter and low pressure warning switch 6. The outlet ports of the brake valve are connected respectively and by lines 7, 7a to the front and rear wheel brake cylinders 8, 8a while the return ports of said valve are connected to the respective reservoir sections whereby there are formed two independent service circuits. For the purpose of the present invention the two supply lines 3, 3a to the brake valve are branched immediately upstream of said valve, the branches 10, 10a being connected respectively to the two inlet ports of a dual hand control valve 11 and each of said branches preferably including an additional accumulator 12 and a non-return valve 13. The two outlet ports of the hand control valve 11 are connected by feed lines 14, 14a to the two fluid supply ports of a dual piston type spring brake actuator 15 while the return ports of the hand control valve 11 are connected respectively by lines 16, 16a to the return lines 9, 9a of the two service circuits. The spring brake unit 15 actuates one set, for example, the rear wheel set, of brakes through a mechanical transmission 17. Thus, not only are the two service circuits completely independent but actuation of the two portions of the spring brake are also independent and the failure of either service circuit cannot cause sudden braking by the spring brake actuator.

The spring brake actuator is preferably of the non-compounding type, that is, in which the spring resisting forces derived from the two pistons are not additive, thus ensuring that the hold-off force counteracting the thrust of the spring remains unaltered should both feed lines be pressurised.

To ensure that a warning is given should the spring brake actuator start to travel and cause the brakes to drag, the two low pressure warning switches 6 may be connected in series to operate an additional buzzer or like warning device, this arrangement being satisfactory where the pressure setting for sensing spring brake dragging coincides with the pressure setting normally used for the service system low pressure warning.

We claim:

1. In a hydraulic braking system of the type wherein two independently powered service circuits are connected through dual valve means to serve separate sets of brakes, said system including spring brake actuator means having operative brake linkage connection to at least one of said sets of brakes, said actuator means embodying two separate hold-off pistons having a common output to said brake linkage, branch lines from the respective service circuits upstream of said dual valve means and adapted to be connected to supply hold-off fluid pressure to the respective pistons of said actuator means, and manual dual valve means in said branch line connections for selectively connecting either of said branch lines to said actuator means.

2. In a hydraulic braking system as claimed in claim 1, wherein the spring brake actuator is of the non-compounding type.

3. In a hydraulic braking system as claimed in claim 1, wherein two pressure fluid feed lines are connected to the dual brake valve means and each line includes an accumulator and a low pressure warning switch, the two switches being connected to operate a warning device.

4. In a hydraulic braking system as claimed in claim 1, wherein each of said branch lines incorporates an accumulator and a non-return valve.

* * * * *